Patented Dec. 11, 1923.

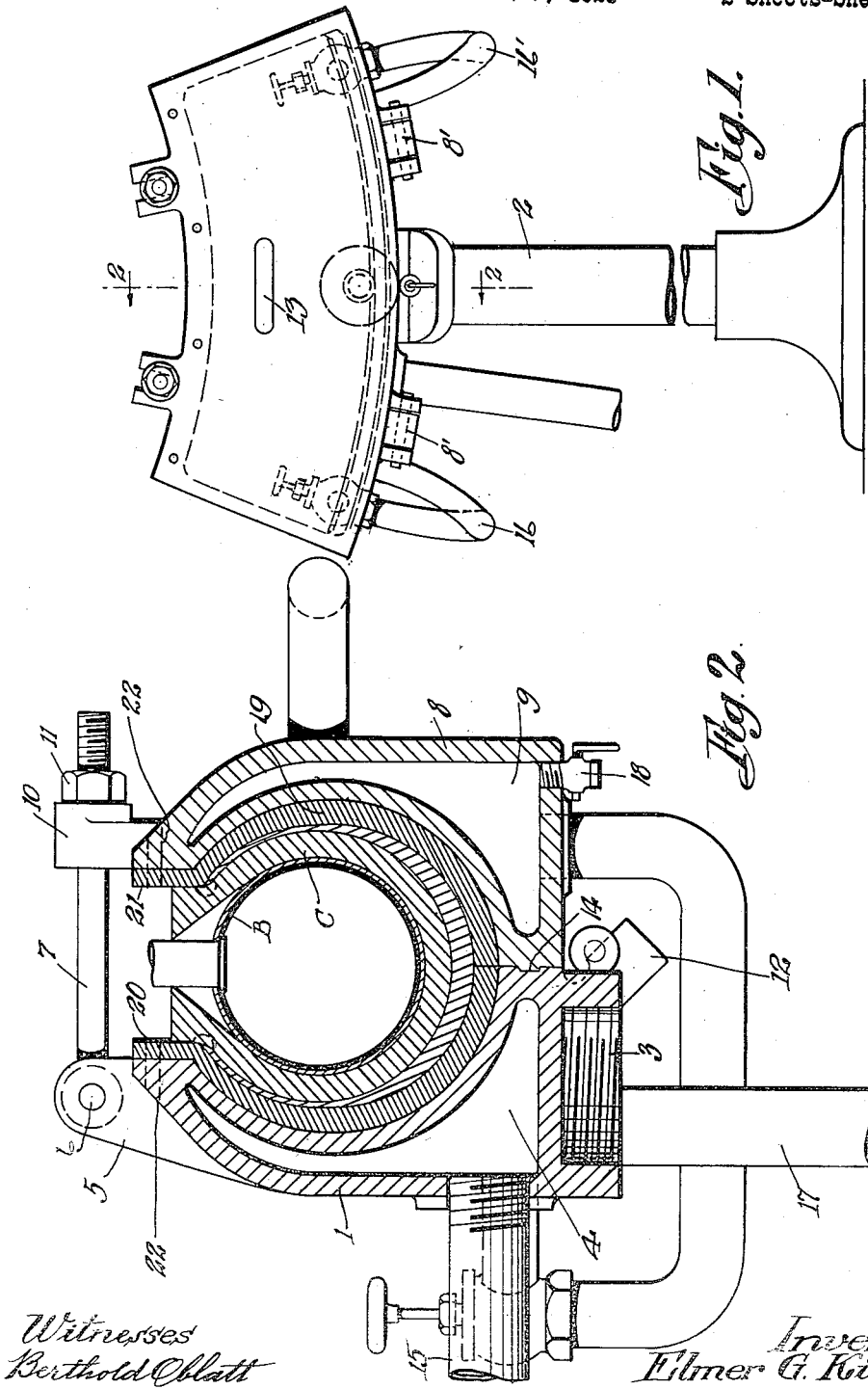

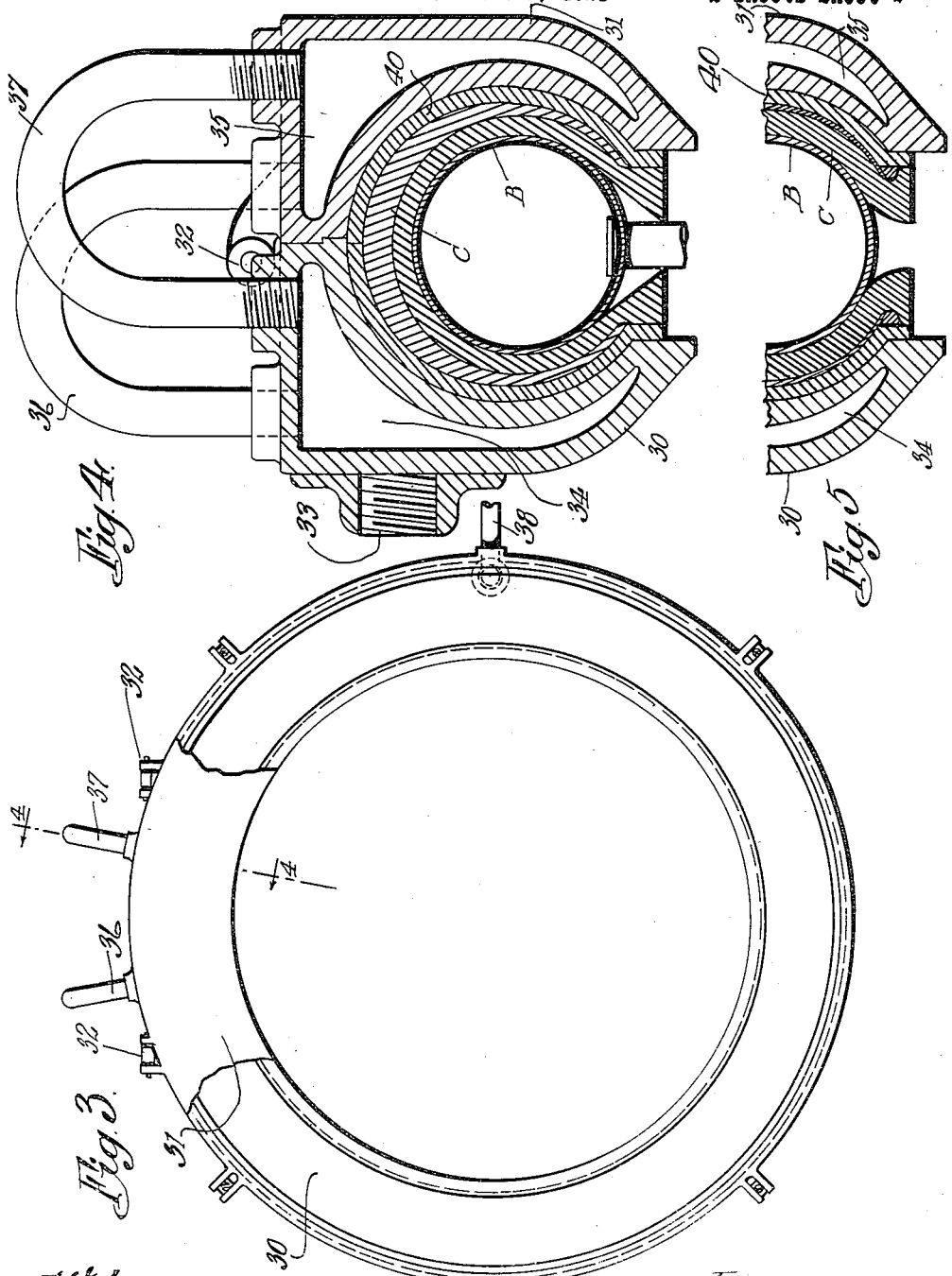

1,477,267

UNITED STATES PATENT OFFICE.

ELMER G. KILLMER, OF CHICAGO, ILLINOIS.

VULCANIZING MACHINE.

Application filed November 9, 1921. Serial No. 513,885.

*To all whom it may concern:*

Be it known that I, ELMER G. KILLMER, a citizen of the United States, and a resident of the city of Chicago, county of Cook, and State of Illinois, have invented certain new and useful Improvements in Vulcanizing Machines, of which the following is a specification.

This invention relates to tire casing vulcanizers and retreaders and has for its object the provision of a simple and efficient apparatus having moulds movable with respect to each other and the steam chambers in such moulds connected by flexible pipes to permit movement of the moulds without disturbing the connections therebetween.

Another object of the invention is to provide interchangeable liners for said moulds to accommodate tire casings of different sizes, the liners and moulds being of such construction that when in position the liners will be substantially continuous, thereby obviating the undesirable ridges or other imperfections commonly caused by use of pieced liners.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation of the invention showing same in operative position, Fig. 2 is a sectional view on the line 2—2, Fig. 1, Fig. 3 is a plan view of a retreader embodying the invention, a portion of the movable member being broken away.

Fig. 4 is a sectional view on the line 4—4. Fig. 3, and

Fig. 5 is a fragmentary sectional view showing a tire having a clincher ring disposed in the retreader.

The invention consists of a segmental mould 1 adapted to be secured to a suitable pedestal 2 by threading the boss 3 thereinto. The mould is provided with a preferably substantially crescent shaped chamber 4, somewhat enlarged at its lower side, extending through the mould. The mould 1 is provided on its upper edges with ears 5 through which are passed pins 6, such pins pivotally securing between said ears the ends of locking bars 7.

Swingably secured to the mould 1 by means of suitable hinges 8′, is a second mould 8, similar to and cooperating with the mould 1, and having therein a chamber 9 similar to the chamber 4. The upper edges of the mould 8 are provided with ears 10, opposite the ears 5, which are adapted to receive therebetween the locking bars 7. The ends of the bars 7 are threaded and have nuts 11 thereon by which the two moulds 1 and 8 may be securely locked. A stop 12 is provided on the stationary mould 1 which limits the swinging movement of the mould 8, and provides a rest therefor, when in inoperative position. The mould 8 is also preferably provided with a handle 13 by which such mould is swung into and out of operative position. As shown in Fig. 2 the lower inner abutting edges of the moulds 1 and 8 are preferably rabbeted as at 14 in order to ensure proper registration of the moulds when being swung into position, and to provide a tight connection between the two moulds.

The chambers 4 and 9 are adapted to be filled with steam, and for this purpose I provide a main intake pipe 15 which has one end communicating with a steam supply and the other end communicating with the chamber 4. The chambers 4 and 9 are preferably connected by suitable flexible pipes 16 and 16′ which connections permit the swinging of the mould 8 on the hinges 8′ when the apparatus is operated, without disturbing such connections. A pipe 17 is also preferably provided in the chamber 4 for the return of the steam to the boiler (not shown). A pet cock 18 is also provided to permit the escape of steam when necessary. By this arrangement a constant circulation of steam at a proper temperature may be maintained in the moulds 1 and 8, the flexible steam pipes 16 and 16′ permitting swinging of the mould 8 without in any way disturbing the connections between the chambers 4 and 9.

For varying the size of the moulds in order to accommodate tire casings C of different sizes and to ensure efficient operation of the apparatus I provide a liner 19. Such liner 19 is preferably split adjacent the lower meeting edges of the moulds 1 and 8 and extends completely around the inner surfaces of the moulds, preferably having tangential projections 20 and 21 which are adapted to be secured to the upper edges of the moulds 1 and 8 by suitable dowel pins 22 as shown in the drawings. The liner 19 may be detached by removing the dowel pins 22, and a similar thicker or thinner liner inserted in place thereof, by this construction affording means for accommodating tire casings of different sizes. No matter what size liner is used it will be noticed that by reason of the peculiar construction of the moulds such liner will be substantially continuous and of an unbroken surface, so as not to mar the surface of the tire which occurs through the use of pieced liners. An air bag B serves to press the casing C against the walls of the mould.

The construction shown in Figs. 3 to 5 is substantially similar to that above described, the only difference being that such apparatus is designed for treating the entire casing necessary in retreading same. The moulds 30 and 31 are circular in form and are connected together by hinges 32. The mould 30 is adapted to engage a suitable pedestal (not shown) by means of the threaded boss 33. The moulds 30 and 31 have chambers 34 and 35, connected by flexible pipes 36 and 37, preferably disposed between the hinges 32. A suitable supply pipe (not shown) supplies steam to the chamber 34, and a drain pipe 38 is provided for returning the steam to the source of supply. The liner 40 is similar to the liner 19 except that it is circular in form. Such liners are interchangeable in the same manner as the liner 19 and are held in position by any suitable means (not shown). In this form of construction the split liner 40 is also adapted to form a substantially continuous and unbroken surface as above described. The construction shown in Fig. 5 shows that a casing having clincher rings may be treated in the same manner as an ordinary casing without making any special changes in the apparatus to accommodate such a casing.

The invention is simple and efficient in operation, having but few parts, and provides an improved apparatus in which interchangeable substantially unbroken liners may be employed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. An apparatus of the character described comprising a stationary mould; a similar oppositely disposed mould hinged thereto, said moulds being adapted to operate upon a tire of one size; a liner attachment for each of said moulds which in operative position form a substantially continuous liner surface, for operating upon a tire of a different size; projections on said liners; and means for securing said projections to said moulds so as not to interfere with said moulds.

2. An apparatus of the character described comprising a stationary mould; a similar mould hinged thereto, said moulds being adapted to operate upon a tire of one size; interengaging rabbets in said molds for alining same and providing a tight connection therebetween; and a liner attachment for each of said moulds for operating upon a tire of a different size in operative position having their meeting ends disposed above said rabbeted connection.

3. An apparatus of the character described comprising oppositely disposed moulds hingedly connected together, and adapted to operate upon a tire of one size; a liner attachment for each of said moulds which in operative position form a substantially continuous liner surface for operating upon a tire of a different size; and means for detachably securing said liners in said moulds.

4. An apparatus of the character described comprising oppositely disposed moulds, adapted to operate upon a tire of one size, and a liner attachment for each of said moulds which in operative position form a substantially continuous liner surface, for operating upon a tire of a different size.

In testimony whereof I have signed my name to this specification in the presence of two subscribing witnesses.

ELMER G. KILLMER.

Witnesses:
FREDA C. APPLETON,
ELSIE C. GEHRKE.